(12) United States Patent
Dahlman et al.

(10) Patent No.: US 6,606,313 B1
(45) Date of Patent: Aug. 12, 2003

(54) RANDOM ACCESS IN A MOBILE TELECOMMUNICATIONS SYSTEM

(75) Inventors: Erik Dahlman, Bromma (SE); Per Beming, Stockholm (SE); Maria Gustafsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/166,679

(22) Filed: Oct. 5, 1998

(51) Int. Cl.[7] .............................................. H04B 7/216
(52) U.S. Cl. ........................ 370/347; 370/337; 370/344; 455/522
(58) Field of Search .................................. 370/329, 335, 370/336, 337, 346, 347, 441, 328, 321, 327, 342, 503, 322, 515, 528, 324; 455/522; 714/748, 749, 750; 375/200, 130, 142–145, 150–152, 211, 140

(56) References Cited

U.S. PATENT DOCUMENTS

| | | | | |
|---|---|---|---|---|
| 5,430,760 | A | | 7/1995 | Dent ........................ 375/200 |
| 5,502,721 | A | * | 3/1996 | Pohjakallio ................ 370/336 |
| 5,544,196 | A | | 8/1996 | Tiedemann, Jr. et al. ... 375/200 |
| 5,577,024 | A | * | 11/1996 | Malkamaki et al. ......... 370/18 |
| 5,673,259 | A | | 9/1997 | Quick, Jr. .................. 370/342 |
| 5,751,708 | A | * | 5/1998 | Eng et al. .............. 370/395.42 |
| 5,850,392 | A | * | 12/1998 | Wang et al. ................ 370/335 |
| 5,940,384 | A | * | 8/1999 | Carney et al. .............. 370/347 |
| 6,181,683 | B1 | * | 1/2001 | Chevillat et al. ........... 370/329 |
| 6,320,843 | B1 | * | 11/2001 | Rydbeck et al. ............ 370/207 |
| 6,381,229 | B1 | * | 4/2002 | Narvinger et al. .......... 370/328 |
| 6,442,153 | B1 | * | 8/2002 | Dahlman et al. ........... 370/342 |

FOREIGN PATENT DOCUMENTS

| | | |
|---|---|---|
| EP | 0 633 671 A2 | 1/1995 |
| WO | WO 98/18280 | 4/1998 |

OTHER PUBLICATIONS

U.S. patent application Ser. No. 08/733,501, filed Oct. 18, 1996 6259724B1.
U.S. patent application Ser. No. 08/847,655, filed Apr. 30, 1997 6163533A.
Standard Search Report for RS 101856 US completed on Jun. 24, 1999.

* cited by examiner

Primary Examiner—Dang Ton
Assistant Examiner—Tri H. Phan
(74) Attorney, Agent, or Firm—Jenkens & Gilchrist, P.C.

(57) ABSTRACT

A method for processing multiple random access requests is disclosed in which a base station transmits an acquisition indicator signal, which indicates that the base station has detected the presence of a random access transmission. The acquisition indicator can be generated based on the amount of energy received on the random access channel (e.g., as opposed to the correct/incorrect decoding of a random access message). Consequently, the delay between the beginning of the random access transmission and the beginning of the acquisition indicator transmission is significantly shorter than the delay to the beginning of an acknowledgment transmission based on the reception of a correctly decoded random access message. If a mobile station does not receive a positive acquisition indicator, it should interrupt the present transmission and start to re-transmit the random access burst in the next time slot, while modifying the transmission power level accordingly between the successive re-transmissions.

56 Claims, 2 Drawing Sheets

RANDOM ACCESS IN A MOBILE TELECOMMUNICATIONS SYSTEM

CROSS-REFERENCES TO RELATED APPLICATIONS

This Application for Patent is related by subject matter to commonly-assigned U.S. Applications for Patent Ser. Nos. 08/733,501, 08/847,655, and 09/148,224, filed Oct. 18, 1996, Apr. 30, 1997, and Sep. 4, 1998, respectively, and Provisional Application Ser. No. 60/063,024, filed Oct. 23, 1997. The above-cited Applications are useful for illustrating certain important premises and the state of the art for the present Application, and are hereby incorporated by reference herein in their entirety.

BACKGROUND OF THE INVENTION

1. Technical Field of the Invention

The present invention relates in general to the mobile telecommunications field and, in particular, to a method for processing multiple random access mobile-originated calls.

2. Description of Related Art

The next (so-called "third") generation of mobile communications systems will be required to provide a broad selection of telecommunications services including digital voice, video and data in packet and channel circuit-switched modes. As a result, the number of calls being made is expected to increase significantly, which will result in much higher traffic density on random access channels (RACHs). Unfortunately, this higher traffic density will also result in increased collisions and access failures. Consequently, the ability to support faster and more efficient random access is a key requirement in the development of the new generation of mobile communications systems. In other words, the new generation systems will have to use much faster and more flexible random access procedures, in order to increase their access success rates and reduce their access request processing times.

A European joint development mobile communications system is referred to as the "Code Division Testbed" (CODIT). In a CODIT-based Code Division Multiple Access (CDMA) system, a mobile station can gain access to a base station by first determining that the RACH is available for use. Then, the mobile station transmits a series of access request preambles (e.g., single 1023 chip symbols) with increasing power levels, until the base station detects the access request. As such, the mobile station uses a "power ramping" process that increases the power level of each successive transmitted preamble symbol. As soon as an access request preamble is detected, the base station activates a closed loop power control circuit, which functions to control the mobile station's transmitted power level in order to keep the received signal power from the mobile station at a desired level. The mobile station then transmits its specific access request data. The base station's receiver despreads and diversity-combines the received signals using, for example, a RAKE receiver or similar type of processing.

In many mobile communication systems, a slotted-ALOHA (S-ALOHA) random access scheme is used. For example, systems operating in accordance with the IS-95 standard (ANSI J-STD-008) use an S-ALOHA random access scheme. The main difference between the CODIT and IS-95 processes is that the CODIT process does not use an S-ALOHA random access scheme. Also, another difference is that the IS-95 mobile station transmits a complete random access packet instead of just the preamble. If the base station does not acknowledge the access request, the IS-95 mobile station re-transmits the entire access request packet at a higher power level. This process continues until the base station acknowledges the access request.

In the above-cited Applications and the IS-95 CDMA technical specifications, different random access methods based on S-ALOHA random access schemes have been described. Essentially (as illustrated in FIG. 1), using a basic S-ALOHA scheme, there are well-defined instants in time (time slots) at which random access transmissions are allowed to begin. Typically, a mobile station (user) randomly selects a time slot in which the transmission of a random access burst (e.g., U1, U2) is to begin. However, the time slots are not pre-allocated to specific users. Consequently, collisions between the different users' random access bursts can occur (e.g., between U3, U4).

In a specific mobile communications system using such an S-ALOHA random access scheme, such as the method disclosed in the above-cited U.S. application Ser. No. 08/733,501 (hereinafter, "the '501 Application"), a mobile station generates and transmits a random access packet. A diagram that illustrates a frame structure for such a random access packet is shown in FIG. 2. The transmitted random access packet ("access request data frame") or "burst" comprises a preamble (10) and a message part (12). Typically, the preamble does not include user information and is used in the base station receiver primarily to facilitate detection of the presence of the random access burst and derive certain timing information (e.g., different transmission path delays). Note that, as illustrated in FIG. 2, there can be an idle period (14) between the preamble and message part during which time there is no transmission. However, using another technique, as described in the above-cited U.S. Provisional Application Serial No. 60/063, 024 (hereinafter, "the '024 Application") and illustrated in FIG. 3, the random access burst does not include a preamble. Consequently, in this case, the base station's random access detection and timing estimation has to be based on the message part only.

In order to reduce the risk of collisions between the random access bursts of two mobile stations that have selected the same time slot, the concept of burst "signatures" has been introduced. For example, as described in the '501 Application (see FIG. 4), the preamble of a random access burst is modulated with a unique signature pattern. Also, the message part is spread with a code associated with the signature pattern used. The signature pattern is randomly selected from a set of patterns that can be, but are not necessarily, orthogonal to each other. Since a collision can occur only between mobile stations' bursts that are using the same signature, the risk of a random access collision is reduced in comparison with other existing schemes. As such, the use of this unique signature pattern feature, as described and claimed in the '501 Application, provides a significantly higher throughput efficiency than prior random access schemes.

In the '024 Application, a mobile station transmits a signature on the Q branch within the message part of the burst. In preparing for the transmission, the mobile station randomly selects the signature from a set of predetermined signatures. Again, since a collision can occur only between mobile stations' bursts that are using the same signature (the primary advantage of the novel use of signatures in general), the risk of a random access collision is reduced in comparison with other existing schemes.

Notably, although the random access systems and methods described in the above-cited Applications have numerous advantages over prior random access schemes, a number of problems still exist that remain to be solved. For example, regardless of the random access method used, a mobile station has to decide just how much random access transmission power to use. Ideally, a mobile station should select a transmission power level such that the random access burst is received at the base station with precisely the power needed for correct decoding of the random access message. However, for numerous reasons, it is virtually impossible to ensure that this will be the case.

For example, the power of the received burst as required at the base station is not constant but can vary (e.g., due to variations in the radio channel characteristics and the speed of the mobile station). As such, these variations are to some extent unpredictable and thus unknown to the mobile station. Also, there can be significant errors in estimating the uplink path-loss. Furthermore, even if a mobile station can determine the "correct" transmission power level to use, because of existing hardware limitations, it is impossible to set the actual transmission power level to precisely the correct value needed.

Consequently, for the above-described reasons, there is a significant risk that a random access burst will be received at the base station with too much power. This condition causes excessive interference for other users and thus reduces the capacity of the CDMA system. For the same reasons, there is also a risk that a random access burst will be transmitted with too little power. This condition makes it impossible for the base station to detect and decode the random access burst.

In order to reduce the risk of transmitting with too much power, in the afore-mentioned IS-95 CDMA system, the initial random access request is transmitted with an additional negative power offset (i.e., with a lower power level than the required transmit power level expected), as shown in FIG. 5. Referring to FIG. 5, the mobile station then re-transmits the random access burst with a reduced negative power offset, until the base station acknowledges (ACK) that it has correctly decoded the random access message ("NACK" denotes no acknowledgment message transmitted). Typically, the base station's acknowledgment is based on the calculation of a cyclic redundancy check (CRC) over the random access message. However, note that a new estimate of the required transmission power may or may not be calculated for each re-transmission. Consequently, it is only the negative offset that is reduced for each re-transmission.

A significant problem that exists with the above-described power ramping approaches is that there is an obvious trade-off between the time delay incurred due to the mobile station re-transmitting the random access bursts until the base station's acknowledgment message is received, and the amount of interference caused by the random access transmission. As such, with a larger negative initial power offset, on the average, more re-transmissions will be needed before the random access burst is received at the base station with sufficient power. On the other hand, with a smaller initial negative power offset, there is an increased risk that the random access burst will be received at the base station with too much power. On the average, this occurrence will cause more interference for other users. For reasonably large negative power offsets, the delay until the acknowledgment of a correctly decoded random access message is transmitted can be significant, because the base station has to receive an entire random access burst before it can transmit the acknowledgment message. As described in detail below, the present invention successfully resolves the above-described problems.

SUMMARY OF THE INVENTION

In accordance with a preferred embodiment of the present invention, a method for processing multiple random access requests is provided whereby a base station transmits an acquisition indicator signal, which indicates that the base station has detected the presence of a random access transmission. For this exemplary embodiment, the acquisition indicator is generated based on the amount of energy received on the random access channel (e.g., as opposed to the correct/incorrect decoding of a random access message). Consequently, the delay between the beginning of the random access transmission and the beginning of the acquisition indicator transmission is significantly shorter than the delay to the beginning of an acknowledgment transmission based on the reception of a correctly decoded random access message. If a mobile station does not receive a positive acquisition indicator, the mobile station should interrupt the present transmission and start to re-transmit the random access burst in the next time slot, while modifying the transmission power level accordingly between the successive re-transmissions.

An important technical advantage of the present invention is that significantly faster power ramping can be achieved in an S-ALOHA random access system.

Another important technical advantage of the present invention is that with an unchanged initial power offset in an S-ALOHA random access scheme, the random access delay can be significantly reduced, which improves the system performance.

Yet another important technical advantage of the present invention is that for the same delay constraints involved, a larger initial power offset can be used for one user in an S-ALOHA random access system, which reduces the risk of excessive interference for other users.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–8 of the drawings, like numerals being used for like and corresponding parts of the various drawings.

Essentially, in accordance with a preferred embodiment of the present invention, a method for processing multiple random access requests is provided whereby a base station transmits an acquisition indicator signal, which indicates that the base station has detected the presence of a random access transmission. For this exemplary embodiment, the acquisition indicator is generated based on the amount of energy received (or, possibly, also the interference energy) on the random access channel (e.g., as opposed to the correct/incorrect decoding of a random access message). Consequently, the delay between the beginning of the random access transmission and the beginning of the acquisition indicator transmission is significantly shorter than the delay to the beginning of an acknowledgment signal transmission based on the reception of a correctly decoded random access message. If a mobile station does not receive a positive acquisition indicator, the mobile station should interrupt the present transmission and start to re-transmit the random access burst in the next time slot, while modifying the transmission power level accordingly between the successive re-transmissions.

Figure 1:
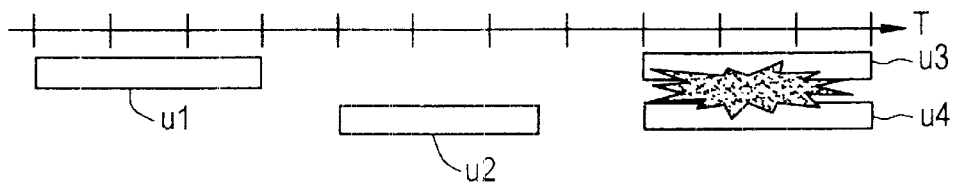
FIG. 1 is a diagram that illustrates how collisions between different users' random access bursts can occur in an S-ALOHA random access scheme.
Figure 2:
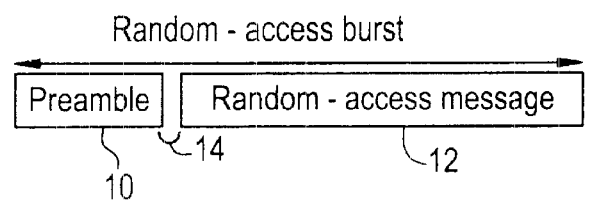
FIG. 2 is a diagram that illustrates a frame structure for a random access packet in an S-ALOHA random access scheme.
Figure 3:
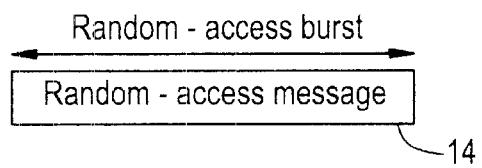
FIG. 3 is a diagram that illustrates a random access burst that does not include a preamble.
Figure 4:
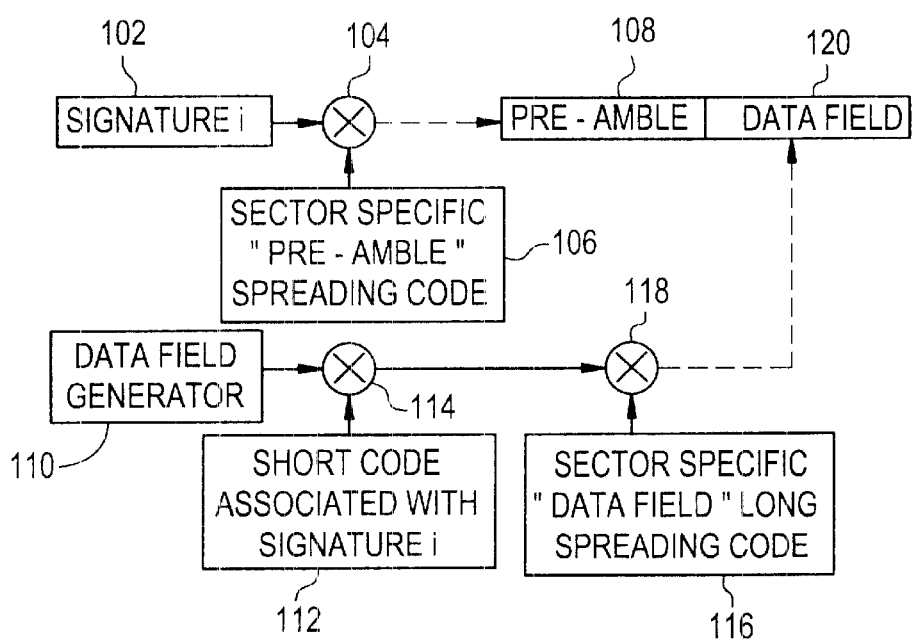
FIG. 4 is a diagram that illustrates a preamble of a random access burst modulated with a unique signature pattern, and a message part spread with a code associated with the signature pattern used.
Figure 5:
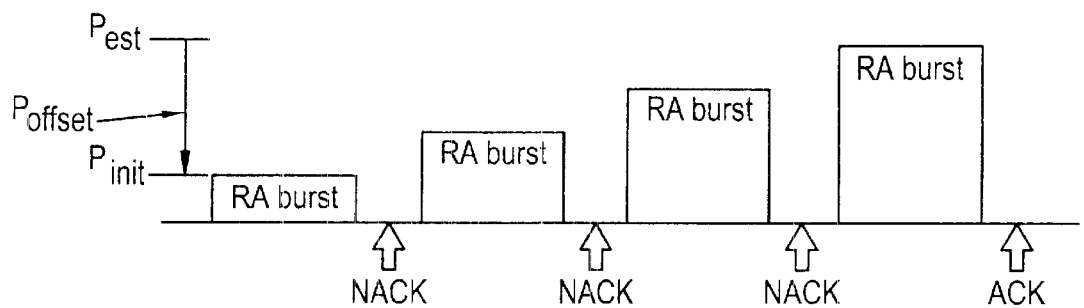
FIG. 5 is a diagram that illustrates a random access transmission with an initial negative power offset.
Figure 6:
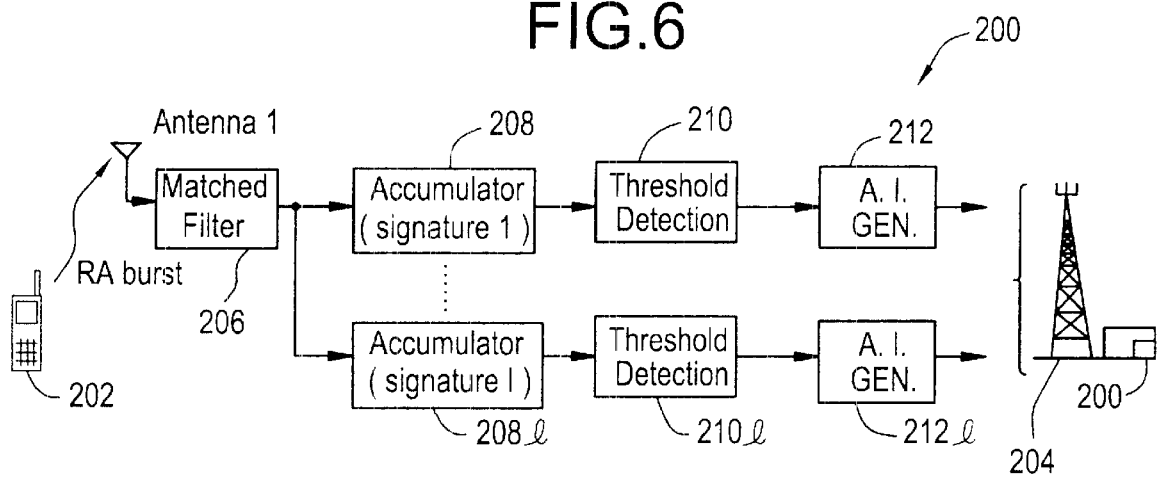
FIG. 6 is a block diagram of an exemplary detection section (for one antenna) that can be used in a base station's receiver to detect the presence of a random access transmission from a mobile station, in accordance with a preferred embodiment of the present invention.
Figure 7:
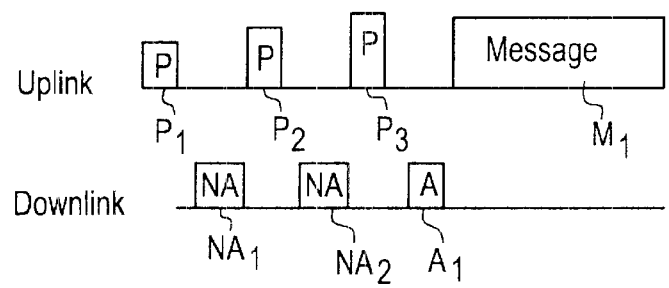
FIG. 7 is a diagram that illustrates a mobile station receiving an acquisition indicator signal during an idle period in a random access burst, in accordance with the preferred embodiment of the present invention.
Figure 8:
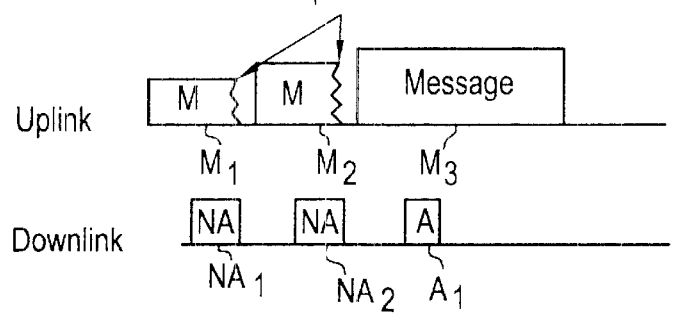
FIG. 8 is a diagram that illustrates a mobile station receiving an acquisition indicator signal in a system where a random access burst has been transmitted without a preamble, in accordance with the preferred embodiment of the present invention.

FIG. 6 is a block diagram of an exemplary detection section (for one antenna) that can be used in a base station's (204) receiver to detect the presence of a random access transmission from a mobile station (202), in accordance with a preferred embodiment of the present invention. The exemplary detection section 200 includes a matched filter 206 (e.g., used during the preamble period) which is tuned (matched) to a preamble's spreading code. For this example, the matched filter is used to detect the presence of the random access burst, despread the preamble part, and feed the despread signal to an appropriate section of an accumulator 208. Since each received preamble can include a unique signature pattern, the accumulator 208 includes one unit tuned to one of the possible signature patterns (1-1) that can be received. The output of each accumulator unit 208(1-1) is coupled to a respective threshold detection unit 210(1-1). The accumulator unit 208 accumulates the energy received over the duration of the preamble.

During the preamble period, if a threshold detection unit 210(1-1) detects an input signal that exceeds a predetermined detection threshold, that threshold detection unit outputs a signal. This output signal (indicating detection of sufficient energy from a received random access burst) is coupled to a respective acquisition indicator generator circuit 212(1-1), which outputs an acquisition indicator signal (A) for transmission by the base station.

For the case where a burst is transmitted without a preamble, the matched filter 206 in FIG. 6 is matched to the spreading code used on the control part of the burst (i.e., where a signature is located). However, in this case, the accumulation performed by the accumulator 208(1-1) occurs for a specified period of time (e.g., just enough time to provide a good estimate, whether or not the base station has received a random access burst).

Notably, the present invention provides a solution that is applicable for those cases where the random access burst both does or does not include a preamble. Specifically, as illustrated by the uplink and downlink transmission diagram shown in the embodiment of FIG. 7, in those cases where a preamble is used, if the idle period in the burst between the preamble (P) and message part is sufficiently large, a mobile station can receive an acquisition indicator (A) transmitted by the base station during that idle period. However, in accordance with an underlying principle of this exemplary embodiment, the mobile station will not transmit the message part ($M_1$) of the random access burst until an acquisition indicator ($A_1$) is received (no acquisition indicator transmission is denoted by "NA"). Instead of transmitting the message part of the burst if no acquisition indicator is received (e.g., $NA_1$, $NA_2$), the mobile station will continue to transmit a new preamble (e.g., $P_2$, $P_3$) As illustrated by the uplink and downlink transmission diagram shown in FIG. 8, in those cases where a preamble is not used in a random access burst (or, for example, the idle period between the preamble and message part is too short in duration), a mobile station will receive the base station's transmitted acquisition indicator ($A_1$) during the mobile station's transmission of a message part ($M_3$) of the burst. However, in accordance with the principles of this exemplary embodiment, if no acquisition indicator is received (e.g., $NA_1$, $NA_2$) at a predetermined instant of time, the mobile station will interrupt its transmission of the message part ($M_1$, $M_2$) of the random access burst, and re-transmit the random access burst in the next time slot until an acquisition indicator ($A_1$) is received.

In a different aspect of the present invention, for those cases where signatures are used in the random access scheme, each acquisition indicator transmitted by a base station can indicate reception of a corresponding signature (transmitted from a mobile station). Alternatively, a plurality of signatures can share one acquisition indicator. In this case, the base station's transmission of the acquisition indicator indicates that at least one of the corresponding signatures (transmitted from a mobile station) has been received. In another aspect of the present invention, a mobile station can also select (randomly or non-randomly) a new signature and/or a new RACH for each burst re-transmission (until an acquisition indicator is received).

A base station can transmit an acquisition indicator signal on a downlink physical channel. Such a physical channel can be dedicated and used only for transmissions of acquisition indicator signals or, for example, the acquisition indicator signals can be time-multiplexed with other signals on one physical channel or on a plurality of different physical channels. As such, a physical channel used for transmission of an acquisition indicator signal can be either orthogonal or non-orthogonal to other downlink physical channels used by the mobile communication system.

In another aspect of the present invention, a base station can transmit an acquisition indicator as a type of "on-off" signal. In other words, the base station transmits the signal only if the base station has detected a random access burst, and does not transmit the signal if a random access burst has not been detected. For example, the base station can transmit acquisition indicator signals as different orthogonal code words for different signatures. In that case, the base station's transmission of a specific code word would indicate the base station's acquisition of a random access signal with the corresponding signature. Alternatively, a plurality of signatures can share one acquisition indicator. In this case, the base station's transmission of the acquisition indicator indicates that at least one of the corresponding signatures has been received.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for improving the performance of a random access mobile communications system, comprising the steps of:
   a mobile station transmitting a random access request, said random access request comprising a preamble, said preamble being modulated with a signature pattern randomly selected from a set of patterns; and
   a base station detecting a presence of said random access request, generating an indicator signal indicating said presence of said random access request, and transmitting said indicator signal to the mobile station prior to decoding of the random access request, wherein said indicator signal is associated with the selected signature.

2. The method of claim 1, wherein said transmitting step comprises transmitting said indicator signal at a predetermined instant of time.

3. The method of claim 1, wherein said indicator signal comprises an ON portion of an ON-OFF signal.

4. The method of claim 1, further comprising the steps of:
   if said mobile station receives said indicator signal, said mobile station continuing said transmitting of said random access request; and
   if said mobile station does not receive said indicator signal by a predetermined instant of time, said mobile station discontinuing said transmitting of said random access request.

5. The method of claim 1, wherein said step of detecting a presence of said random access request comprises detecting a power level equal to or exceeding a predetermined threshold level.

6. The method of claim 1, wherein said random access mobile communications system comprises a spread spectrum mobile communications system.

7. The method of claim 1, wherein said random access mobile communications system comprises a wideband CDMA system.

8. The method of claim 1, wherein said indicator signal comprises an acquisition indicator signal.

9. The method of claim 1, wherein said indicator signal is transmitted on a physical channel.

10. The method of claim 4, wherein said step of discontinuing said transmitting of said random access request further comprises the step of re-transmitting said random access request in a subsequent time slot.

11. The method of claim 10, wherein the step of re-transmitting said random access request includes re-transmitting the preamble.

12. The method of claim 11, wherein the step of re-transmitting comprises re-transmitting said preamble with a different spreading code.

13. The method of claim 11, wherein the step of re-transmitting comprises re-transmitting said preamble with a different signature.

14. The method of claim 12, further comprising the step of said mobile station reducing a negative power offset for said random access request prior to said re-transmitting step.

15. The method of claim 9, wherein said physical channel is a downlink channel that is orthogonal to other downlink physical channels.

16. The method of claim 9, wherein said physical channel is a downlink physical channel that is non-orthogonal to other downlink physical channels.

17. The method of claim 1, wherein said indicator signal is associated with a unique signature.

18. The method of claim 1, wherein said indicator signal is associated with a set of unique signatures.

19. The method of claim 17, wherein said indicator signal comprises an orthogonal code word associated with said unique signature.

20. The method of claim 17 or 18, wherein said indicator signal comprises an ON part of an ON-OFF signal.

21. A random access communications system, comprising:
   a mobile station, said mobile station including a transmitter for transmitting a random access request, said random access request comprising a preamble, said preamble being modulated with a signature pattern randomly selected from a set of patterns; and
   a base station coupled to said mobile station via an air interface, said base station configured to detect a presence of said random access request, generate an indicator signal indicating said presence of said random access request, and transmit said indicator signal to the mobile station prior to decoding of the random access request, wherein said indicator signal is associated with the selected signature.

22. The system of claim 21, wherein said means for transmitting comprises means for transmitting said indicator signal at a predetermined instant of time.

23. The system of claim 21, further comprising:
   said mobile station including means for receiving said indicator signal, and determining if said mobile station has received said indicator signal, and if so, said mobile station continuing said transmitting of said random access request; and
   if said mobile station does not receive said indicator signal by a predetermined instant of time, said mobile station discontinuing said transmitting of said random access request.

24. The system of claim 21, wherein said means for detecting a presence of said random access request comprises means for detecting a power level equal to or exceeding a predetermined threshold level.

25. The system of claim 21, wherein said random access communications system comprises a spread spectrum mobile communications system.

26. The system of claim 21, wherein said random access communication system comprises a wideband CDMA system.

27. The system of claim 21, wherein said indicator signal comprises an acquisition indicator signal.

28. The system of claim 21, wherein said indicator signal is transmitted on a physical channel.

29. The system of claim 23, further comprising means for re-transmitting said random access request in a subsequent time slot.

30. The system of claim 29, wherein said means for re-transmitting said random access request includes means for re-transmitting the preamble.

31. The system of claim 30, wherein said means for re-transmitting comprises means for re-transmitting said preamble with a different spreading code.

32. The system of claim 30, wherein said means for re-transmitting comprises means for re-transmitting said preamble with a different signature.

33. The system of claim 29, further comprising means for reducing a negative power offset for said random access request prior to said re-transmitting.

34. The system of claim 28, wherein said physical channel is a downlink channel that is orthogonal to other downlink physical channels.

35. The system of claim 28, wherein said physical channel is a downlink physical channel that is non-orthogonal to other downlink physical channels.

36. The system of claim 21, wherein said indicator signal is associated with a unique signature.

37. The system of claim 21, wherein said indicator signal is associated with a set of unique signatures.

38. The system of claim 36 or 37, wherein said indicator signal comprises an ON part of an ON-OFF signal.

39. The method of claim 1, wherein the step of transmitting is performed prior to completion of the decoding of said random access request.

40. The system of claim 21, wherein base station transmits said indicator signal prior to the completion of the decoding of said random access request.

41. A method for improving the performance of a random access mobile communications system, said method comprising the steps of:
   detecting a presence of a random access request from a mobile station at a base station, wherein said step of detecting a presence of said random access request comprises detecting a power level equal to or exceeding a predetermined threshold level;
   generating an indicator signal indicating said presence of said random access request; and
   transmitting said indicator signal to the mobile station prior to decoding of said random access request, wherein said indicator signal is associated with a selected signature.

42. The method of claim 41, wherein the step of transmitting is performed prior to completion of the decoding of said random access request.

43. A method for improving the performance of a random access mobile communication system, said method comprising the steps of:
   transmitting, by a mobile station, said random access request comprising a preamble, said preamble being modulated with a signature pattern randomly selected from a set of patterns;
   detecting, by a base station, a presence of the random access burst prior to decoding of the random access burst;
   generating an acquisition indicator signal indicating the presence of the random access burst, wherein said indicator signal is associated with the selected signature; and
   transmitting, by the base station, the acquisition indicator signal to the mobile station.

44. The method of claim 43, wherein the step of transmitting the acquisition indicator signal associated with the at least one unique signature indicates the reception of the random access burst having the at least one unique signature from the mobile station.

45. The method of claim 43, wherein the at least one unique signature comprises a set of unique signatures.

46. The method of claim 43, wherein the acquisition indicator signal is associated with a plurality of unique signatures.

47. The method of claim 43, wherein the acquisition indicator signal comprises an orthogonal code word.

48. The method of claim 43, wherein the at least one unique signature is located in a control part of the random access burst.

49. The method of claim 43, wherein the at least one unique signature is located in a preamble of the random access burst.

50. A base station within a mobile communication system comprising:
   an antenna for receiving a random access burst, said random access request comprising a preamble, said preamble being modulated with a signature pattern randomly selected from a set of patterns, and
   wherein said base station is configured to generate an acquisition indicator indicating the receipt of the random access burst, wherein said indicator signal is associated with the selected signature, and transmit the acquisition indicator signal to the mobile station prior to decoding of the random access burst.

51. The base station of claim 50, wherein the acquisition indicator signal transmitted by the base station indicates to the mobile station reception of the random access burst having the at least one unique signature.

52. The base station of claim 50, wherein the at least one unique signature comprises a set of unique signatures.

53. The base station of claim 50, wherein the acquisition indicator signal is associated with a plurality of unique signatures.

54. The base station of claim 50, wherein the at least one unique signature is located in a control part of the random access burst.

55. The base station of claim 50, wherein the at least one unique signature is located in a preamble of the random access burst.

56. The base station of claim 50, further comprising:
   a matched filter for detecting the presence of the random access burst and despreading a preamble part of the random access burst;
   a plurality of accumulators for accumulating the energy received over the duration of the preamble part of the random access burst, each one of the plurality of accumulators being tuned to a different unique signature;
   a plurality of detectors for detecting the energy in the plurality of accumulators and selecting the accumulators that have the energy exceeding a determined threshold; and
   a plurality of acquisition indicator generation circuits coupled to the plurality of detectors for receiving the input signal from an associated one of the detectors and outputting the acquisition indicator signal associated with one of the accumulators having its energy exceeding the determined threshold and tuned to the unique signature.

* * * * *